United States Patent
Badar et al.

(10) Patent No.: US 11,108,832 B2
(45) Date of Patent: Aug. 31, 2021

(54) NETWORK COMPONENT SELECTION BASED ON DEVICE IDENTIFIER

(71) Applicant: T-Mobile USA, Inc., Bellevue, WA (US)

(72) Inventors: Saqib Badar, Bellevue, WA (US); Christopher H. Joul, Bellevue, WA (US); Shujaur Rehman Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/584,801

(22) Filed: Sep. 26, 2019

(65) Prior Publication Data

US 2021/0099497 A1     Apr. 1, 2021

(51) Int. Cl.
| | |
|---|---|
| *H04L 29/06* | (2006.01) |
| *H04W 12/06* | (2021.01) |
| *H04L 12/851* | (2013.01) |
| *H04L 29/12* | (2006.01) |
| *H04L 12/859* | (2013.01) |

(52) U.S. Cl.
CPC ...... *H04L 65/1016* (2013.01); *H04L 47/2425* (2013.01); *H04L 47/2475* (2013.01); *H04L 61/1511* (2013.01); *H04L 65/105* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2004/0146040 A1* | 7/2004 | Phan-Anh | ........... | H04L 65/1016 370/349 |
| 2004/0162892 A1* | 8/2004 | Hsu | ........................ | H04L 63/20 709/221 |
| 2005/0159156 A1* | 7/2005 | Bajko | ................. | H04L 65/1073 455/435.1 |
| 2007/0086581 A1* | 4/2007 | Zhu | ....................... | H04L 65/104 379/88.17 |
| 2009/0181671 A1* | 7/2009 | Preiss | ................. | H04L 65/1016 455/435.1 |
| 2010/0263026 A1* | 10/2010 | Huo | .................... | H04L 61/2015 726/4 |

(Continued)

*Primary Examiner* — Scott B Christensen
(74) *Attorney, Agent, or Firm* — Lee & Hayes, P.C.

(57) ABSTRACT

Systems and methods for selectively routing a connect to a network through a control function associated with the network. The system can distinguish between control functions based on functionalities associated with the control function itself or capabilities associated with a user device. The system can select between the control functions based at least in part on an identifier associated with the user device, a subscriber account associated with the user device, or another trait of the connection. The system can select the control function based on a determination made by a control node associated with the network and may be further based on a Network Resource Function, a Domain Name System server, internal static listings of the control functions, or other resource that associates one or more identifiers with the control function. The system can obtain the identifier once the user device requests a connection with the network and provide the identifier to the control node.

20 Claims, 7 Drawing Sheets

(56) References Cited

U.S. PATENT DOCUMENTS

| | | | |
|---|---|---|---|
| 2010/0329226 A1* | 12/2010 | Norefors | H04L 65/1016 |
| | | | 370/338 |
| 2011/0131267 A1* | 6/2011 | Shen | H04L 61/1588 |
| | | | 709/201 |
| 2011/0141942 A1* | 6/2011 | Qiu | H04L 41/082 |
| | | | 370/254 |
| 2012/0042084 A1* | 2/2012 | Dutta | H04L 65/1069 |
| | | | 709/228 |
| 2012/0185613 A1* | 7/2012 | Noldus | H04L 65/1073 |
| | | | 709/248 |
| 2013/0010804 A1* | 1/2013 | Fernandez Alonso | H04L 65/1016 |
| | | | 370/428 |
| 2016/0302055 A1* | 10/2016 | Oohira | H04W 8/20 |
| 2019/0075139 A1* | 3/2019 | Bouvet | H04L 65/105 |

\* cited by examiner

NETWORK COMPONENT SELECTION BASED ON DEVICE IDENTIFIER

BACKGROUND

Presently, when a user device attempts to connect to a network, the user device often transmits a request to connect with the network to a user-side packet core associated with the network. In response to the request, a control node associated with the user-side packet core and can route the user device connection to an IP Multimedia Subsystem (IMS) core associated with the network. The control node may route the user device connection through a control function associated with the IMS core. The primary methods for establishing a session between a control node and a control function rely on a static listing of the control functions associated with the IMS core.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
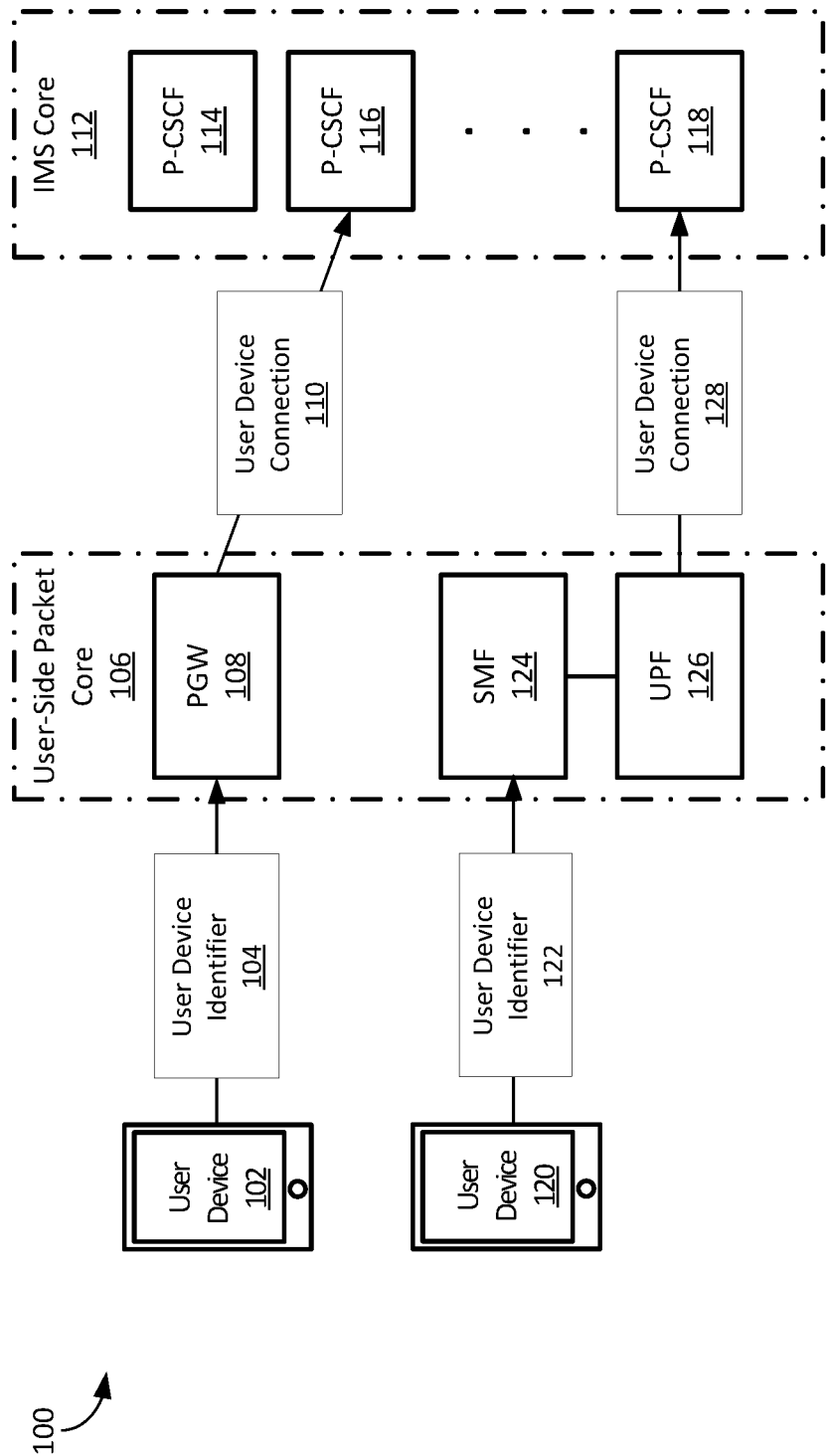
FIG. 1 depicts a network including both 4G and 5G infrastructure routing user device connections to an Internet Protocol (IP) Multimedia Subsystem (IMS) core associated with the network.

This disclosure describes systems, devices, and techniques for optimizing services and features provided to user devices connected to a network. By distinguishing between control functions in the network, a user device can be connected to a subset of the control functions in the network. The subset of control function can be optimized to provide services and features utilized and/or required by the user device. The network can create sessions between user devices and appropriate control functions associated with an IMS core according to static listings or other databases associated with the control functions of the IMS core. Additionally, the described systems, devices, and techniques may create sessions between a user device and an IMS core of any network infrastructure including, but not limited to, third generation (3G), fourth generation (4G), fifth generation (5G), and future generations of networks.

In some embodiments, the systems, devices, and techniques described herein improve the efficiency and functionality a network by enabling a control node to selectively choose which control functions a user device can be connected with based on various capabilities or traits associated with the user device. Control functions can be separated into two or more groups distinguished by one or more functionalities associated with or assigned to the control functions. The one or more functionalities can include service agreements, carve-outs, limitations of user devices, additional features associated with user devices, security requirements, and/or other service options requiring delineation between control functions. Distinguishing control functions based on the one or more functionalities enables the specialization of network resources and optimized allocation of connections between the control functions and user devices capable of utilizing assigned network resources.

In some embodiments, a control node may receive an identifier associated with a user device from a mobile session management node (MSMN) connected with the user device and other network nodes within the user-side packet core. This identifier may be associated with a user device, subscriber account, or other identifying feature. Additionally, the identifier can permit the control node to determine one or more capabilities associated with a user device. Each group of control functions can be associated with one or more identifier ranges or identifier values based at least in part on the one or more capabilities associated with the user device. In some embodiments, a group of control functions can be assigned identifier ranges or values based at least on the capabilities associated with the identifiers utilizing or requiring the one or more functionalities associated with the group of control functions. In at least one embodiment, control functions can be assigned to a group of control functions upon registering with the network. The control functions may register with a network node, a service associated with the network, or a network resource associated with the network. The association between groups of control functions and various identifiers may be stored by control nodes, network nodes, internal servers, or external servers associated with the network.

Individual network nodes, including control nodes and control functions, associated with the IMS core or a user-side packet core can be virtualized nodes, physical nodes, or any combination of the two. In some embodiments, when a session between a network and a user device is established, the user device can initially transmit an attach request to an access network or to a MSMN associated with the user-side packet core. The access network and/or MSMN can route the connection through a control node of the user-side packet core of the network. Additionally, the access network and MSMN can cause the user device to connect a node of the user-side packet core of the network associated with the control node. The control node can then cause a session to be established between a control function of the IMS core and the user device to connect the user device with the network. The term user-side packet core is not intended to limit the present disclosure to packet switched connections. Instead, the technology discussed herein can be implemented on alternative technologies including at least a circuit-switched network. Similarly, the term IMS core is not intended to limit the present disclosure as other network architectures or frameworks may support implementation of the systems and methods discussed herein.

In some described embodiments, a control node of a network can be described as a Packet Gateway (PGW), a Session Management Function (SMF), or any other node associated with establishing a connection between a user device and an IMS core of the network. The identifier associated with a user device may be an International Mobile Equipment Identifier (IMEI), International Mobile Subscriber Identifier (IMSI), IMS Private User Identity (IMPI), Subscription Permanent Identifier (SUPI), or other identifier associated with user device capabilities. Additionally, the IMPI can further include an IMPI realm that can be considered by the network. Further, the associations between identifier ranges and/or values may be stored in a Domain Name System (DNS), Home Subscriber Server (HSS), Network Resource Function (NRF), a static listing of a control node, and/or other appropriate locations associated with the network.

The IMS core of the network can be divided into at least two groups of control functions. In some embodiments, the control functions can be Proxy Call Session Control Functions (P-CSCFs). Each group of control functions can be assigned one or more identifier values or one or more identifier ranges by the network. Additionally, the control functions can be associated with one or more identifier ranges and identifier values independent of the network. The assigned identifier ranges and identifier values can indicate one or more capabilities associated with a user device and enable control nodes of the network to connect a user device with a control function that has been optimized or designated to provide network services and features to those capabilities. In some embodiments, each group of control functions can be distinguished from other groups based on one or more control function capabilities, service agreements, carve outs, and other functionalities associated with the control functions. In some embodiments, each group of control functions can be designated, via a designation, for serving user devices with one or more capabilities. These capabilities may include high security application, insecure connections, specific authentication methods, guaranteed service levels associated with a subscription, alternative equipment functionalities, user device associations with other networks, and/or service agreements. As noted above, this allows for specialization of network resources and optimization of their allocation to devices capable of utilizing those network resources.

An identifier received by an access network can be transmitted to a control node associated with the network. In some embodiments, the control node can identify, based on the identifier, a group of control functions and can connect the user device with one of the control functions based on one or more selection rules. The one or more selection rules permit the control node to determine a control function within the group of control functions that the user device should be connected with. Accordingly, once a control function is selected by the control node, the control node can the user device can be connected with the control function or instruct a network node associated with the user-side packet core to connect the user device connection with the control function.

In some embodiments, determining an appropriate group of control functions for a user device can be based on static listing entries, a DNS query, internal NRF control function discovery, or other appropriate methods. In at least one embodiment, discovery of P-CSCFs or groups of P-CSCFs can be executed by a PGW, SMF, or other control node in combination with other nodes associated with the network, an internal server of the network, or a server associated with the network. While the disclosure primarily discusses 4G and 5G network infrastructure, the core methodology is applicable to other network infrastructures and is not limited to 4G and 5G networks.

FIG. 1 is a block diagram illustrating a network 100 according to some embodiments. Network 100 can contain network infrastructure associated with both 4G and 5G networks. Additionally, network 100 is not limited to the depicted network nodes and may include additional access networks, network nodes, and network functions not depicted by the diagram. Further, network 100 may comprise additional network infrastructures not shown. In an embodiment, network 100 may include 3G network infrastructure such as Serving GPRS Support Nodes (SGSNs), Gateway GPRS Support Nodes (GGSNs), and other associated network nodes and access networks. While network 100 can utilize 3G, 4G, and 5G network infrastructure, network 100 is not limited to the illustrated embodiments and may utilize alternative network infrastructures including wireless local area networks, local area networks, wide area networks, digital subscriber line networks, and other types IP connectivity access networks (IP-CAN).

In some embodiments of FIG. 1, a user device 102 can be any suitable computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a network digital camera, a global positioning system (GPS) device, and/or other similar mobile devices. Although this description predominantly describes user device 102 as being "mobile" or "wireless," (e.g., configured to be carried and moved around), it is to be appreciated that user device 102 may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "user device" may be used interchangeably to describe a user device capable of performing the techniques described herein. In some examples, user device 102 can have one or more capabilities that require a connection to a control function having one or more functionalities.

In some embodiments of FIG. 1, user-side packet core 106 can comprise at least Packet Gateway (PGW) 108, Session Management Function (SMF) 124, and User Plane Function (UPF) 126. PGW 108 and SMF 124 can determine that user device 102 and user device 120, respectively, are to be connected IMS core 112. PGW 108 and SMF 124 can identify a P-CSCF of the plurality of P-CSCFs to connect with a user device. In at least one embodiment of FIG. 1, PGW 108 and SMF 124 can include predefined static listings associated with each P-CSCF of the plurality of P-CSCFs and predefined rules for selecting a P-CSCF. For example, the PGW 108 and SMF 124 may sequentially cycle through the available P-CSCFs for each connection request they receive. Additionally, the PGW 108 and SMF 124 may consider the load on each P-CSCF of the plurality of P-CSCFs and select a P-CSCF capable of accepting an additional connection. In at least an additional embodiment of FIG. 1, PGW 108 and SMF 124 can transmit a request to a server for a P-CSCF that a user device may connect with. The server can include predefined static listings associated with each P-CSCF of the plurality of P-CSCFs, apply similar rules for selecting a P-CSCF, and return a Fully Qualified Domain Name (FQDN) associated with a selected P-CSCF.

In some additional embodiments of FIG. 1, PGW 108 can receive a user device identifier 104 associated with user device 102. Similarly, SMF 124 can receive a user device identifier 122 associated with user device 120. Based at least on the respective user device identifier, PGW 108 and SMF 124 can perform discovery of control functions associated with IMS core 112. For instance, PGW 108 can perform control function discovery and determine, based on user device identifier 104, that user device 102 can be connected with P-CSCF 116. PGW 108 can create a session between user device 102 and P-CSCF 116 based at least on a first user device capability and a first functionality associated with P-CSCF 116. Similarly, SMF 124 can perform control function discovery and determine, based on user device identifier 122, that user device 120 can be connected with P-CSCF 118. SMF 124 can create a session between user device 120 and P-CSCF 118 based at least on a second user device capability and a second functionality associated with P-CSCF 118. Accordingly, PGW 108 can establish a session, user device connection 110, with P-CSCF 116 and SMF 124 can cause UPF 126 to establish a session, user device connection 128, with P-CSCF 118. Further, while IMS core 112 is illustrated to include P-CSCF 114, P-CSCF 116, and P-CSCF 118 it should be noted that IMS core 112 can include a plurality of P-CSCFs not illustrated by FIG. 1.

Figure 2:
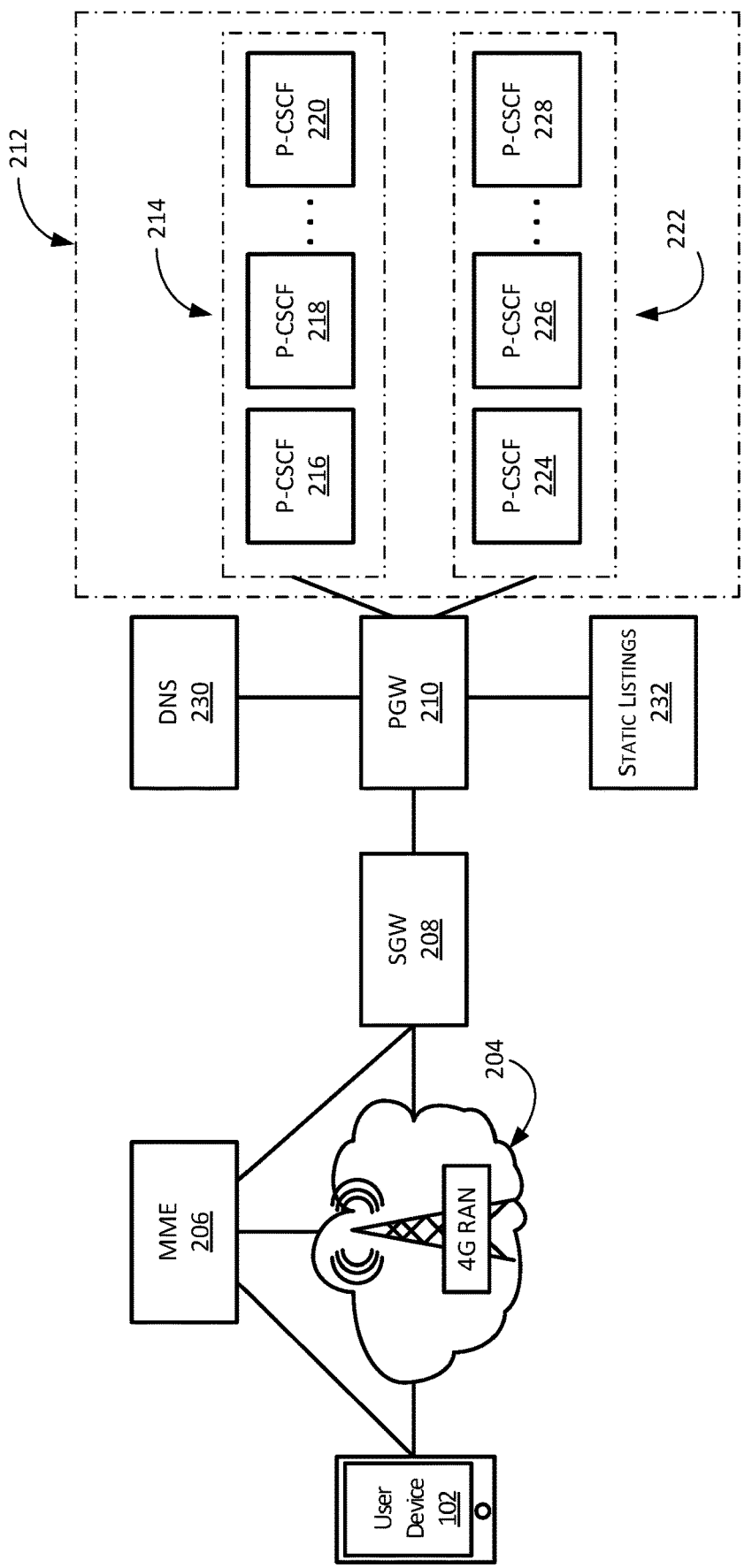
FIG. 2 depicts a network of the present invention comprising 4G infrastructure, an IMS core that has been divided into at least two groups of network nodes, and network resources utilized in routing user device connections to a group of network nodes associated with the IMS core.

FIG. 2 is a block diagram illustrating a 4G network infrastructure according to some embodiments. In some embodiments of FIG. 2, PGW 210 can determine that user device 102 can be connected with IMS core 212 of the network and create a session between user device 102 and IMS core 212. IMS core 212 can comprise a plurality of network nodes. Additionally, IMS core 212 can comprise a plurality of control functions including P-CSCF 216, P-CSCF 218, ..., and P-CSCF 228. Further, in the network depicted by FIG. 2, IMS core 212 may comprise two or more groups of P-CSCFs. For example, P-CSCF 216, P-CSCF 218, ..., and P-CSCF 220 may comprise a first P-CSCF group 214. Similarly, P-CSCF 224, P-CSCF 226, ..., and P-CSCF 228 may comprise a second P-CSCF group 222. P-CSCF group 214 and P-CSCF group 222 can be distinguished based on one or more functionalities associated with the P-CSCFs. Further, while IMS core 212 is illustrated as containing two P-CSCF groups of three P-CSCFs, it should be understood that IMS core 212 can comprise a plurality of P-CSCF groups not illustrated and each P-CSCF group can comprise one or more P-CSCFs. Similarly, P-CSCF group 214 can include P-CSCF 216, P-CSCF 218, ..., and P-CSCF 220 that each comprise one or more different functionalities other than the one or more functionalities associated with P-CSCF group 214.

In some embodiments of FIG. 2, a user device 102 may access a user-side packet core of a network via an access network such as a 4G Radio Access Network (RAN) 204. Additionally, user device 102 can connect with Serving Gateway (SGW) 208 via 4G RAN 204 and Mobile Management Entity (MME) 206. Similarly, user device 102 may further connect with PGW 210 via SGW 208. The user-side packet core of the network can comprise one or more 4G RANs, one or more MMEs, one or more SGWs, and one or more PGWs. In at least one embodiment of FIG. 2, MME 206 may determine that the user device is to be routed through SGW 208.

In some embodiments of FIG. 2, the P-CSCFs are control functions of IMS core 212, wherein IMS core 212 can be associated with a home network of user device 102. In at least one additional embodiment, the control functions can be associated with a visited network different from the home network of user device 102 and provide access to IMS core 212 of the home network. In at least one further embodiment, the control functions can be associated with the home network of user device 102 and provide access to IMS core 212 of a network different than the home network. Additionally, the control functions can act as a first point of contact between user device 102 and the network and a last point of contact before a message is sent from the network to user device 102. Further, control functions can serve as a proxy for other network nodes of IMS core 212. In some embodiments, the other network nodes may comprise Interrogating Call Session Control Functions (I-CSCFs) and Service Call Session Control Functions (S-CSCFs).

In some embodiments of FIG. 2, PGW 210 can perform P-CSCF discovery to determine that user device 102 should be routed to P-CSCF group 214 or P-CSCF group 222 based on an identifier associated with user device 102. The identifier associated with user device 102 may be an International Mobile Equipment Identifier (IMEI), an International Mobile Subscriber Identifier (IMSI), an IMS Private User Identity (IMPI), or any other appropriate identifier associated with user device 102. Additionally, the identifier can indicate that user device 102 includes one or more capabilities that utilize or require functionalities associated with P-CSCF group 214 or P-CSCF group 222. In at least one embodiment of FIG. 2, the identifier associated with user device 102 may be provided to PGW 210 by MME 206. Alternatively, the PGW 210 may be provided or acquire the identifier through communications with user device 102 or another network node associated with the user-side packet core.

In some embodiments of FIG. 2, PGW 210 can determine, during P-CSCF discovery and based at least on an identifier, one or more capabilities associated with user device 102 that utilize or require one or more functionalities associated with P-CSCF group 214, P-CSCF group 222, or any other P-CSCF group associated with IMS core 212. In some embodiments of FIG. 2, PGW 210 may comprise or have access to Static Listings 232. Static Listings 232 can include one or more identifier values or ranges that are associated with P-CSCF group 214 and P-CSCF group 222. The one or more identifier values or ranges can be associated with a P-CSCF group based on the one or more user device capabilities indicated by an identifier and the one or more functionalities associated with the P-CSCFs of P-CSCF group 214 and P-CSCF group 222.

In some embodiments of FIG. 2, PGW 210 can transmit the identifier associated with user device 102 to a server. The server can be Domain Name Server (DNS) 230, wherein DNS 230 can comprise the one or more identifier values or ranges that are associated with P-CSCF group 214 and P-CSCF group 222 based at least on similar interactions as those discussed above. Accordingly, PGW 210 can transmit a request, including the identifier, to DNS 230 during P-CSCF discovery. In response to the request, DNS 230 may determine whether the identifier matches identifier values or ranges assigned to P-CSCF group 214 and P-CSCF group 222. Upon determining which P-CSCF group is associated with the identifier, DNS 230 may select a P-CSCF associated with the appropriate P-CSCF group according to one or more selection rules. DNS 230 may further comprise a Fully Qualified Domain Name (FQDN) associated with the selected P-CSCF and transmit the FQDN to PGW 210. PGW 210, upon receiving the FQDN, may establish a session between the selected P-CSCF and user device 102.

Figure 3:
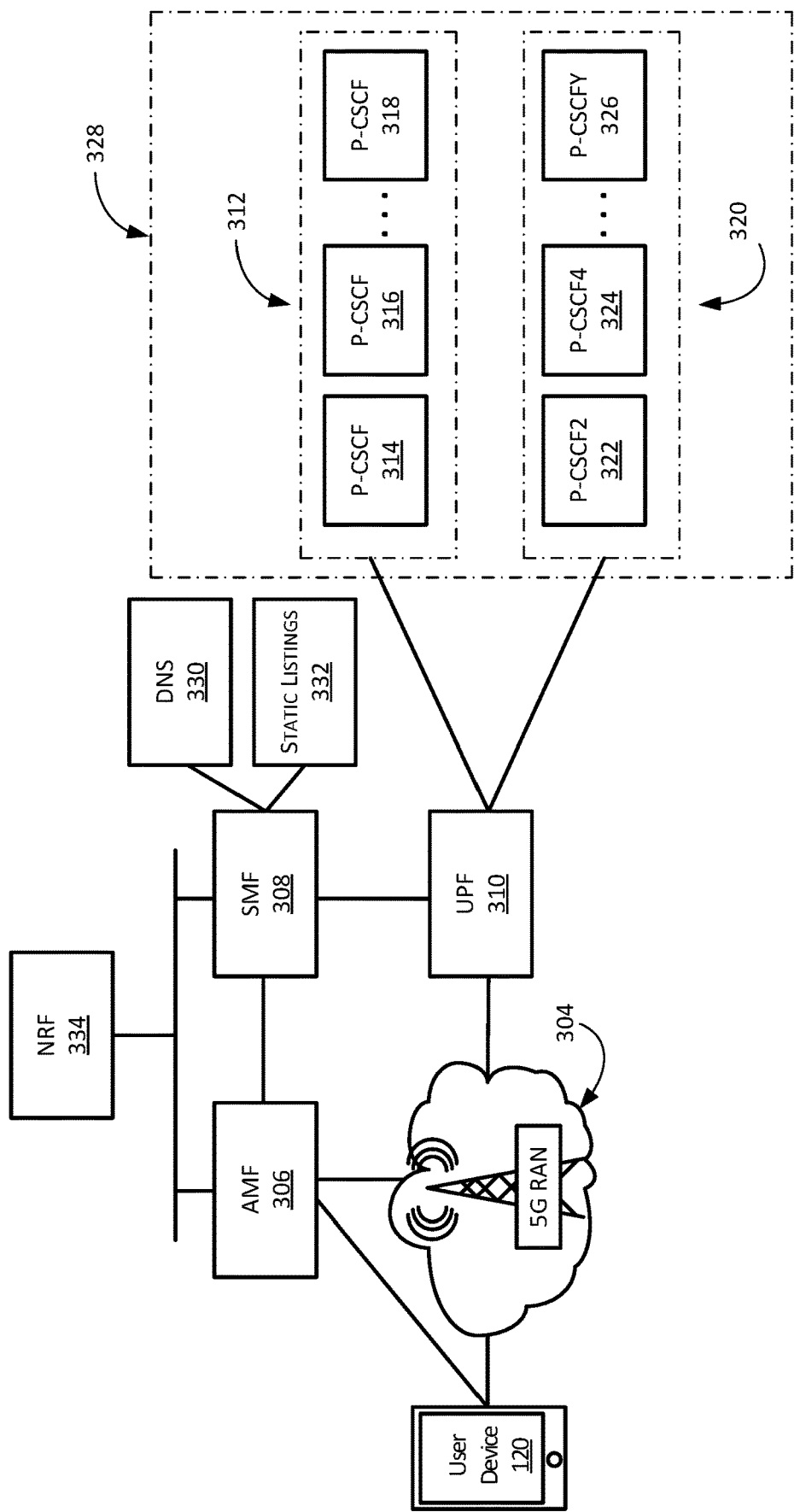
FIG. 3 depicts a network of the present invention comprising 5G infrastructure, an IMS core that has been divided into at least two groups of network nodes, and network resources utilized in routing user device connections to a group of control functions associated with the IMS core.

FIG. 3 is a block diagram illustrating a 5G network infrastructure according to some embodiments. In the network depicted by FIG. 3, and similar to the 4G network infrastructure of FIG. 2, IMS core 328 can include at least P-CSCF group 312 and P-CSCF group 320. P-CSCF group 312 can include P-CSCF 314, P-CSCF 316, . . . , and P-CSCF 318. P-CSCF group 320 can comprise P-CSCF 322, P-CSCF 324, . . . , and P-CSCF 326. P-CSCF group 312 and P-CSCF group 320 can be distinguished based on one or more functionalities associated with the P-CSCFs. Further, while IMS core 328 is illustrated as containing two P-CSCF groups of three P-CSCFs, it should be understood that IMS core 328 can comprise a plurality of P-CSCF groups not illustrated and each P-CSCF group can comprise one or more P-CSCFs. Similarly, P-CSCF group 312 can include P-CSCF 314, P-CSCF 316, . . . , and P-CSCF 318 that each comprise one or more different functionalities other than the one or more functionalities associated with P-CSCF group 312.

In some embodiments of FIG. 3, user device 120 may be a portable communication device similar to user device 102 and capable of communicating with the network. User device 120 may access a user-side packet core of the network via an access network such as a 5G Radio Access Network (RAN) 304. Additionally, user device 120 can be routed through User Plane Function (UPF) 310 via 5G RAN 304 and Access Management Function (AMF) 306. In an embodiment of FIG. 3, AMF 306 can determine that the user device is to be connected with Session Management Function (SMF) 308 and UPF 310. Further, the network can comprise one or more 5G RANs, one or more AMFs, one or more SMFs, and one or more UPFs.

In some embodiments of FIG. 3, SMF 308 can determine that user device 120 is to be connected with IMS core 328 of the network and cause a session to be established between user device 120 and IMS core 328. In at least one embodiment of FIG. 3, SMF 308 can determine that the session associated with user device 120 should be established with P-CSCF 314 and subsequently cause UPF 310 to initiate a connection with P-CSCF 314.

SMF 308 can perform P-CSCF discovery to determine that user device 120 should be routed to P-CSCF group 312 or P-CSCF group 320 based on an identifier associated with user device 120. The identifier associated with user device 120 may be an IMEI, an IMSI, an IMPI, a Subscription Permanent Identifier (SUPI), or any other appropriate identifier. Additionally, the identifier can indicate that user device 120 includes one or more capabilities that utilize or require functionalities associated with P-CSCF group 312 or P-CSCF group 320. In at least one embodiment of FIG. 3, the identifier associated with user device 120 may be provided to SMF 308 by AMF 306. Alternatively, the SMF 308 may be provided or acquire the identifier through communications with user device 120 or another network node associated with the user-side packet core.

In some embodiments of FIG. 3, SMF 308 can determine, during P-CSCF discovery and based at least on an identifier, one or more capabilities associated with user device 120 that utilize or require one or more functionalities associated with P-CSCF group 312, P-CSCF group 320, or any other P-CSCF group associated with IMS core 328. In some embodiments of FIG. 3, SMF 308 may comprise or have access to Static Listings 332. Static Listings 332 can include one or more identifier values or ranges that are associated with P-CSCF group 312 and P-CSCF group 320. The one or more identifier values or ranges can be associated with a P-CSCF group based on the one or more user device capabilities indicated by an identifier and the one or more functionalities associated with the P-CSCFs of P-CSCF group 312 and P-CSCF group 320.

In some embodiments of FIG. 3, SMF 308 can transmit the identifier associated with user device 120 to a server. The server can be Domain Name Server (DNS) 330, wherein DNS 330 can comprise the one or more identifier values or ranges that are associated with P-CSCF group 312 and P-CSCF group 320 and identify what user device capabilities are supported by each P-CSCF group. Accordingly, SMF 308 can transmit a request, including the identifier, to DNS 330 during P-CSCF discovery. In response to the request, DNS 330 may determine whether the identifier matches identifier values or ranges assigned to P-CSCF group 312 and P-CSCF group 320. Upon determining which P-CSCF group is associated with the identifier, DNS 330 may select a P-CSCF associated with the appropriate P-CSCF group according to one or more selection rules. DNS 330 may further comprise a Fully Qualified Domain Name (FQDN) associated with the selected P-CSCF and transmit the FQDN to SMF 308. SMF 308, upon receiving the FQDN, may establish a session between the selected P-CSCF and user device 120.

In some embodiments of FIG. 3, SMF 308 may transmit a request, including at least the identifier, to Network Resource Function (NRF) 334. Generally, NRF 334 is utilized by various network nodes, including SMF 308, to locate a function associated with the network. Accordingly, NRF 334 may contain the one or more identifier values or ranges that are associated with P-CSCF group 312 and P-CSCF group 320 and identify the one or more user device capabilities associated with each P-CSCF group. NRF 334, in response to SMF 308 requesting to locate a control function, can identify a control function that the user device is to be connected with.

Figure 4:
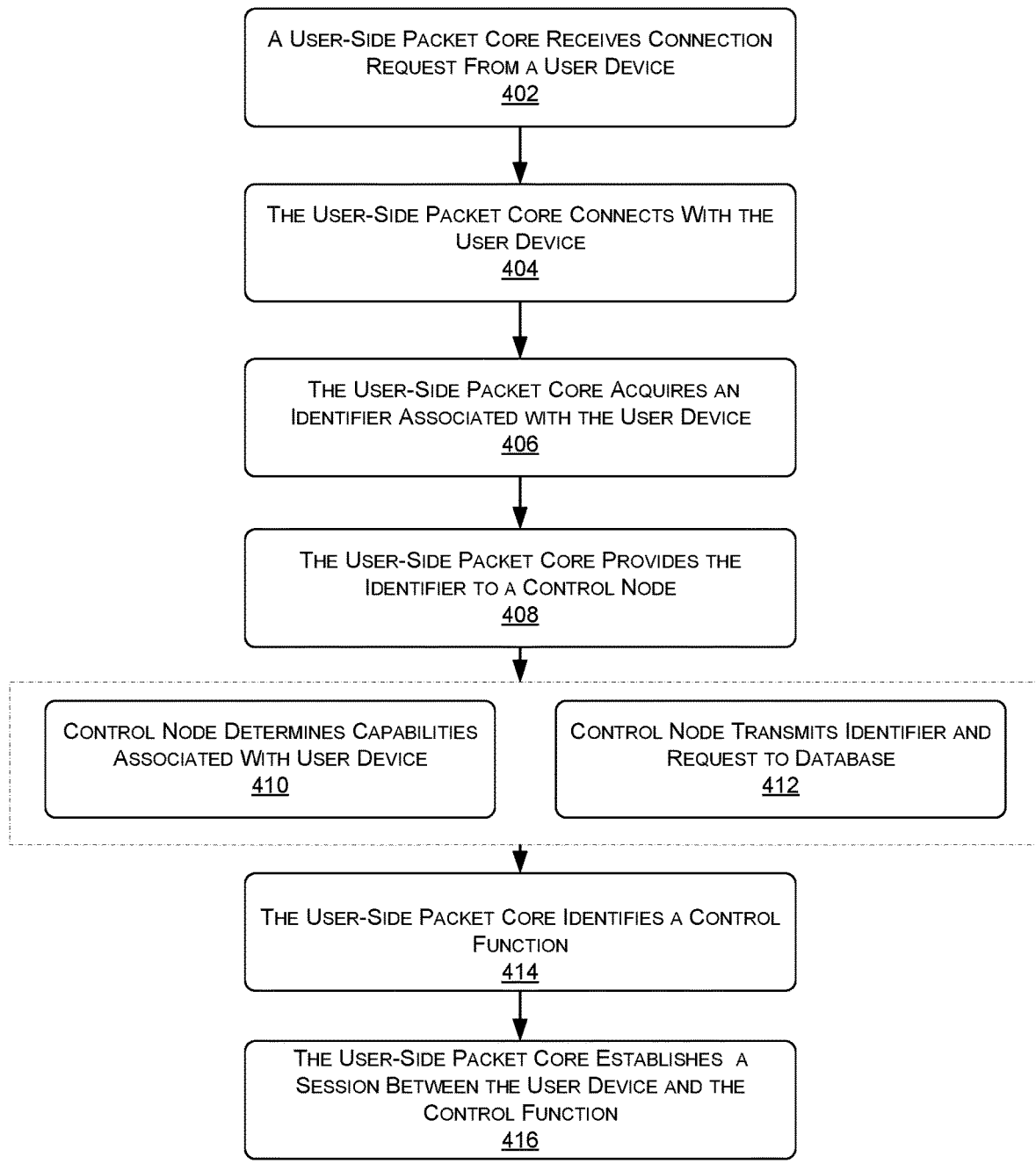
FIG. 4 is a flowchart describing a method for routing a connection associated with a user device to a control function associated with an IMS core based at least on user device capabilities.

FIG. 4 illustrates a method for identifying a control function comprised of one or more functionalities that can be utilized and/or required by one or more capabilities associated with a user device according to some embodiments. The illustrated method may be carried out by the networks depicted by FIG. 2, FIG. 3, and other networks comprised of analogous network nodes.

At block 402, a user device may request a connection with a network. In some embodiments, the request can comprise an attach request that is transmitted to a user-side packet core associated with the network. Additionally, the user device can connect to the user-side packet core via an access network, wherein the access network can be a 4G RAN 204, 5G RAN 304, or another type of access network known in the art. Further, the user device can transmit the attach request and other initial communications to other network nodes associated with the user-side packet core via the access network.

At block 404, the user device can connect with the user-side packet core. As noted above, the user side packet core can comprise a plurality of virtual or physical network nodes. In some embodiments, the user-side packet core can include at least one or more access networks, one or more mobile session management nodes (MSMNs), and one or more control nodes. In some embodiments, the MSMNs can include Mobile Management Entities (MMEs), Access Management Functions (AMFs), and other network nodes capable of performing verification and authentication procedures for the network. In some additional embodiments, the control nodes can include Packet Gateways (PGWs), Session Management Functions (SMFs), and other network nodes capable of controlling the user device connection to the IMS core associated with the network.

At block 406, the user-side packet core can comprise a MSMN that acquires an identifier associated with the user device, an identifier associated with a user subscription of the user device, or some other identifier that indicates or can be used to determine one or more capabilities associated with the user device. Additionally, the MSMN can acquire the identifier from the user device during verification and authentication of the user device. In some embodiments, the identifier acquired by the MSMN is an IMSI associated with the user device acquired during subscription verification and authentication. During this procedure, the MSMN authenticates the information provided by the user device and verifies that the user device is subscribed to an IMS APM or other subscription service. In some additional embodiments, the MSMN can perform a procedure to acquire an IMEI associated with the user device. In at least one embodiment, the MSMN can perform an equipment identity check and other equipment checks to ensure that the user device has not been stolen, that the user device is compatible with the network infrastructure, and that permitting the user device to connect with the network will not negatively impact the network. In at least one additional embodiment, the MSMN can perform an equipment identity register (EIR) check, based at least on the IMEI, to verify the identity of the user device. In some further embodiments, the MSMN may acquire a SUPI or other extensible identifier comprising one or more fixed identifiers. The SUPI or other extensible identifiers may comprise one or more of the IMSI, the IMEI, an IMPI, or other appropriate identifiers. In the various embodiments discussed above, the identifier can be obtained from the user device, a Home Subscriber Server (HSS) associated with the network, or another databased that contains one or more of the above identifiers.

At block 408, the user-side packet core can provide the identifier associated with the user device to a control node associated with the user-side packet core. In some embodiments, the MSMN can push the identifier associated with the user device to a control node associated with the user-side packet core. The MSMN can push any of the above identifiers to the control node upon completion of the various authentication and verification processes related to the user device or the subscription associated with the user device. In some additional embodiments, the control node can request the identifier from the MSMN.

At block 410, the user-side packet core, via the control node, can identify a group of control functions comprising one or more functionalities that are utilized and/or required by the one or more user device capabilities. The control node can be a PGW 210, a SMF 308, or other control node associated with the user-side packet core. Similarly, the user device can be associated with an identifier that indicates one or more user device capabilities. In some embodiments, the control node can utilize Static Listings 232 or 332 to determine a group of control functions associated with one or more identifier values or identifier ranges that include the identifier associated with the user device.

At block 412, the user-side packet core, via the control node, can transmit the identifier associated with the user device and a request to a database or server associated with the network to identify a group of control functions. In some embodiments, the control node can be PGW 210 or SMF 308 and can utilize DNS 230 or 330 and/or NRF 334 to determine a group of control functions associated with one or more identifier values or identifier ranges that include the identifier associated with the user device.

At both blocks 410 and 412, groups of control functions may be differentiated based on one or more functionalities associated with the control functions that comprise each group. While the groups of control functions may be differentiated based on one or more functionalities, the one or more functionalities can be associated with different capabilities associated with individual control functions, can be assigned to individual control functions having the same capabilities, or some combination of the two. In at least one embodiment, a first control function may have the same capabilities as a second control function, but may be assigned by the network to provide one or more first functionalities different from one or more second functionalities provided by the second control function. In an at least one additional embodiment, the first control function may have different capabilities than a second control function and can provide one or more first functionalities different from one or more second functionalities provided by the second control function. In at least one further embodiment, the first control function may include capabilities some capabilities shared with the second control function and some capabilities different from the second control function. Accordingly, the first control function may provide one of more first functionalities different from the one or more second functionalities provided by the second control function due to both network determinations and capability limitations. Generally, the one or more functionalities refers to the function or service that is provided by the control function while the one or more capabilities refers to what the control function is capable of completing and/or providing.

In some embodiments of FIG. 4, as well as FIGS. 2 and 3, a group of control functions can comprise one or more functionalities that satisfy requirements associated with one or more services and/or features provided by the network. Additionally, the control node can determine whether a user device comprises one or more capabilities that utilize or require the one or more functionalities associated with the network services and/or features. Additionally, the one or more functionalities can determine that the one or more services are required by the user device. Further, the one or more services can be features of the network that are available to certain classes of subscribers or certain types of devices. A second group of control functions can comprise one or more functionalities that maintain a level of connectivity and/or quality of service (QoS) specified by an agreement. A third group of control functions can comprise one or more functionalities that provide a high QoS voice service for user devices. A fourth group of control functions can comprise one or more functionalities that provide low QoS voice service that the network provides to user devices. For example, the fourth group of control functions may be a freely accessible level of service that can be provided to user devices without compromising the QoS provided by other groups of control functions. Generally, groups of control functions may be distinguished based on service requirements, network features, service features, voice services, messaging services, QoS levels, and/or other service related variables. For example, this may include a group of control functions assigned to provide Rich Communication Services (RCS) and a group of control functions assigned to connect with user devices not capable of utilizing RCS functions. Alternatively, a group of control functions may be assigned to connect with user devices that are identified as Internet of Things (IoT) devices that lack various voice services and/or includes a messaging service not available to other user devices.

In some embodiments of FIG. 4, as well as FIGS. 2 and 3, a group of control functions can comprise one or more functionalities related to network processes. The one or more functionalities can be utilized and/or required by one or more network processes associated with the user device. In some embodiments, a group of control functions can comprise one or more functionalities that are associated with the network providing real-time services to a user device. A second group of control functions can comprise one or more functionalities optimized to provide voice services. A third group of control functions can comprise one or more functionalities optimized to provide messaging services. In at least one embodiment, a group of control functions can provide functionalities associated with an IMS core of a home network associated with the user device while another group of control functions is associated with an IMS core of a different network. Accordingly, either group of control functions can include one or more functionalities that permit a connection to be established with the home network or the different network. In at least one embodiment, the ability for a control function associated with a first network to connect with the IMS core of a second network is known as local breakdown. Additionally, the ability to utilize the local breakdown is known as a local breakdown capability and can be a functionality of the control function that is associated with the first network and is capable of connecting with the IMS core of the second network.

In some embodiments of FIG. 4, as well as FIGS. 2 and 3, a group of control functions can comprise one or more functionalities related to security and authentication for the network. The one or more functionalities associated with a group of control functions can provide different encryption services to a user device. A first group of control functions can comprise one or more functionalities that can provide high security applications or services that require and/or utilize encryption capabilities and heavier computation requirements. Additionally, the one or more functionalities that are required and/or utilized by the high security applications or services can comprise one or more unique authentication methods associated with the high security applications or services. A second group of control functions can comprise one or more functionalities that provide encryption services for communications or connections across insecure environments. A third group of control functions can comprise one or more functionalities that support one or more authentication methods associated with a connection or a user device. Similar to the first group of control functions, the one or more functionalities associated with the third group of control functions can include one or more unique authentication methods associated with specific connections or user devices.

While the above embodiments are discussed as individual groups of control functions having one or more functionalities associated with various network features, the examples are not intended to limit this disclosure. A group of control functions may provide one or more functionalities associated with multiple of the above embodiments. Additionally, a group of control functions may be generally accessible to all connections. Further, a group of control functions may be assigned to connect with user devices attempting to access network features not discussed above. Generally, these control functions can be assigned identifier ranges or values that are used to determine whether a user device can connect or have a session established with a group of control functions.

In some embodiments, one or more shared functionalities can be provided by two or more groups of control functions. A control node can identify a group of control functions to establish a session with based at least on a comparison of the relative utilization of one or more first functionalities associated with a first group of control functions and one or more second functionalities associated with a second group of control functions. In at least one embodiment the control node can compare additional groups of control functions comprising one or more additional functionalities to the above groups of control functions. In some embodiments, the control node can determine whether the one or more user device capabilities utilize the one or more first functionalities more than the one or more second functionalities. In some additional embodiments, the control node can determine that the one or more user device capabilities require the one or more first functionalities and only utilize the one or more second functionalities. Additionally, the control node can determine that the one or more user device capabilities require the one or more first functionalities despite heavily utilizing the one or more second functionalities. Further, the control node can assign weights to the required and/or utilized functionalities associated with both the first group of control functions and the second group of control functions.

In some embodiments, two or more groups of control functions can each provide one or more control functions that can be utilized and/or required by one or more capabilities associated with the user device. For example, a first group of control functions can provide one or more first functionalities that are different from one or more second functionalities provided by a second group of control functions. In some embodiments, and as discussed above, the control node can distinguish the two groups of control functions based at least on relative utilization of the. In some additional embodiments, the control node can establish a session between the user device and the group of control functions capable of providing the one or more functionalities utilized and/or required by the network service and/or feature associated with the attach request transmitted to the network by the user device.

At block 414, the user-side packet core, via the control node, can identify a control function of the group of control functions to connect the user device with. Additionally, the control node can further utilize the various network resources and one or more selection rules to determine the control function that will connect with the user device. Further, the control node can establish a session between the user device and the control function identified by the one or more selection nil es.

At block 416, the user-side packet core, via the control node, completes the identification process and establishes a session with the appropriate control function. The session may be established by the control node connecting with the control function or by causing another network node to connect with the control function. In some embodiments, the IMS core may be a 4G core, a 5G core, or another network infrastructure core. Additionally, the user side packet core may be a 4G user-side packet core, a 5G user-side packet core, and/or another user-side packet core. Further, one or more of the above user-side packet cores may be directed to connect with an IMS core having a different network infrastructure, based at least on a group of control functions of the IMS core comprising one or more functionalities utilized and/or required by the connection. In at least one embodiment of FIG. 4, a user device can be connected, via two user-side packet cores, to two IMS cores.

Figure 5:
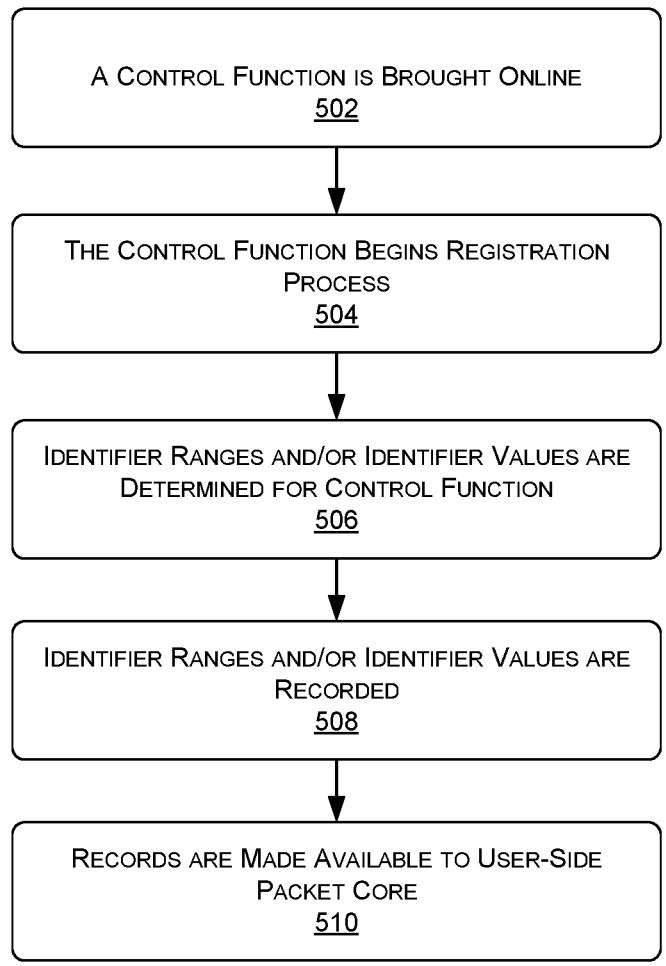
FIG. 5 is a flowchart that describes a method for registering control functions with network resources utilized in establishing user device connections.

FIG. 5 illustrates a method for registering control functions with network resources utilized in establishing user device connections according to some embodiments. The illustrated method may be carried out by the networks depicted by FIG. 2, FIG. 3, and/or another network comprised of analogous network nodes.

At block 502, a control function is brought online and associated with an IMS core of a network. The control function can be a virtual node or a physical node within the network and comprises one or more capabilities. Generally, each control function associated with the IMS comprises similar capabilities, but in some examples may comprise additional capabilities not included in other control functions or lack capabilities included in other control functions.

At block 504, the control function becomes active and initiates the registration process with a network node, a server associated with the network, and/or another network resources. In some embodiments, the control function may initiate registration with PGW 210, SMF 308, Static Listing 232 or 332, DNS 230 or 330, and/or NRF 334. In some additional embodiments, the network node, server, or resource may query the control function for identifying information once the control function has become active. Generally, the control function will at least identify itself to the network node, server, and/or resource and provide an IP address associated with itself.

At block 506, identifier ranges and/or identifier values are determined and assigned to the control function. In some embodiments, the control function can further provide appropriate identifier ranges and/or values to the network nodes, server, or resource function when it provides the identifying information. In some additional embodiments, the control function may be assigned to a group of control functions and assigned appropriate identifier ranges and/or values based at least on its control function group. In some further embodiments, the control function may be assigned appropriate identifier ranges and/or identifier values based at least on the one or more capabilities associated with the control function. Generally, the identifier ranges and/or values will be determined and assigned to the control function such that the one or more functionalities to be provided by the control function are associated with appropriate user devices. Accordingly, at block 508, the appropriate identifier ranges and/or identifier values are recorded with the appropriate network node, server, and/or resource.

At block 510, the network node, server, or resource can provide or utilize the control function records to the user-side packet core. Generally, a control node may either access or request information from the control function records. In some embodiments, the identifier is an IMEI and indicates one or more equipment capabilities associated with the user device. In some additional embodiments, the identifier is an IMSI and indicates one or more subscription capabilities associated with the user device. In some further embodiments, the identifier is an IMPI and indicates one or more general capabilities associated with the user device. Additionally, the IMPI can be generally associated with the IMSI or explicitly associated with the IMSI. Further, the identifier can be an IMPI realm and indicate one or more domains or realms associated with one or more groups of control functions.

In some embodiments, the identifier can indicate that a user device has a home network that is different from the current network, e.g. the user device is a roaming device. Accordingly, the identifier may belong to an identifier range or have an identifier value associated with a group of control functions having one or more functionalities assigned to roaming device. In at least one embodiment, the group of control functions includes one or more functionalities that cause the control functions to connect with the home network of the roaming device. In at least one additional embodiment, the user device may be identified as a roaming device based in part on one or more domains or realms indicated by the identifier.

Figure 6:
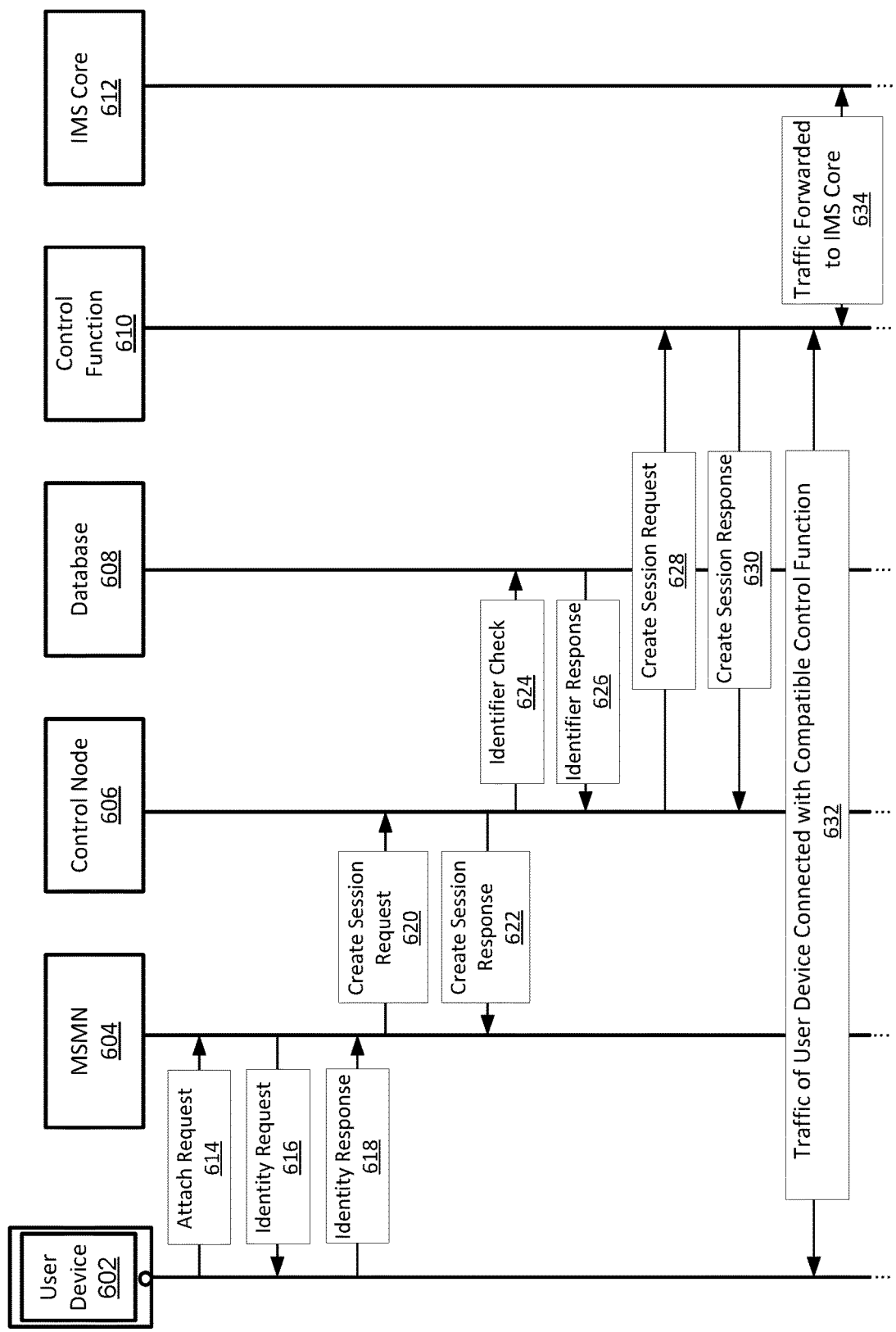
FIG. 6 is a timing diagram for establishing a connection between a user device and a control function of a network via a control node of the present disclosure.

FIG. 6 illustrates a timing diagram for establishing a connection between a user device 602 and a control function 610 associated with IMS core 612 of a network. User device 602 can be user device 102 or 120 as described above. MSMN 604 can be MME 206, AMF 306, MME 206, or AMF 306. Control Node 606 can be PGW 108, SMF 124, PGW 210, or SMF 308. Database 608 can be any Static Listing, DNS, NRF, or other database associated with a network. Control Function 610 can be any control function associated with the network including at least a P-CSCF. IMS Core 612 can be IMS Core 112, IMS Core 212, or IMS Core 328. Additionally, any of the above items from FIG. 6 can represent the various network nodes, servers, and resources described in FIGS. 4 and 5.

At 614, user device 602 can transmit an attach request to a network. The attach request can be received by MSMN 604. Additionally, the attach request may be received by an access network and transmitted to MSMN 604.

At 616, MSMN 604 can transmit an identity request to user device 602. At 618, user device 602 can transmit an identity response containing at least an identifier to MSMN 604. The identifier received by MSMN 604 can include an IMSI, an IMEI, an IMPI, an IMPI realm, and/or a SUPI. Additionally, MSMN 604 can execute various authentication, verification, and security processes to further establish the identity of user device 602.

At 620, and in response to the identity response, the MSMN 604 can transmit a create session request to control node 606. The create session request can include the identifier received from user device 602. At 622, control node 606 may response to the create session request with a create session response to MSMN 604. The create session response can prompt a connection associated with the user device to be established with control node 606. The established connection can include additional network nodes in addition to control node 606.

At 624, control node 606 can initiate an identity check to determine a control function to establish a session with. In some embodiments, control node 606 can include database 608. In some additional embodiments, control node 606 can be separate from database 608, wherein database 608 can exist as a network node, a server associated with the network, or a network resource.

At 626, the identity response can include results from control node 606 or database 608 comparing the identifier received from MSMN 604 with identifier ranges and/or identifier values stored and maintained in database 608. In some embodiments, control node 606 can store the identifier ranges and identifier values in an internal database 608. Additionally, database 608 can be separate from control node 606. Database 608 can be a DNS server storing FQDNs associated with individual control functions in addition to the identifier ranges and identifier values associated with groups of control functions. Further, database 608 can be a NRF where network control functions register as they are activated within the network and record the identifier ranges and identifier values associated with user device capabilities that utilize or require one or more functionalities of the control functions.

At 624 and 626, control node 606 can determine one or more capabilities associated with user device 602 based at least on the identifier received from MSMN 604. Additionally, control node 606 can identify two or more groups of control functions associated with the network. In some embodiments, the groups of control functions can be differentiated based on one or more functionalities associated with individual control functions of each group. The one or more functionalities can be assigned functionalities or determined based on one or more capabilities associated with individual control functions. Further, the one or more functionalities can be required and/or utilized by the one or more capabilities associated with the user device. The functionalities associated with the control functions and compatibilities associated with the user device may relate to network services, network features, authentication, security, service agreements, or any other factor that can distinguish between control functions. Accordingly, control node 606 can determine, based at least on the identifier, one or more capabilities associated with the user device by transmitting an identifier check to database 608 and receiving a corresponding identifier response.

At 628, control node 606 can transmit a create session request to control function 610, wherein control function 610 was identified based at least on the identifier response. In some embodiments, control function 610 may be identified based on one or more selection rules and the identifier response. The selection rules can identify a control function out of the group of control functions indicated by the identifier response based on at least one of iterating through the one or more control functions associated with the group of control functions or determining that control function 610 possesses sufficient capacity to accept a user device connection. At 630, control function 610 can transmit a create session response that results in user device 602 to connect with control function 610.

At 632, traffic from user device 602 can be transmitted to control function 610 via the use device connection.

At 634, traffic from user device 602 can be further transmitted to IMS core 612. In some embodiments, IMS core 612 can be associated with a home network of the user device. In at least one embodiment, a home network may be a network that is associated with the user device via a subscription. The subscription can be an agreement between a user of the user device and a network carrier associated with the network. In at least one additional embodiment, IM core 612 can comprise control functions associated with the home network and can further direct user device traffic to an IMS core associated with a different network.

Figure 7:
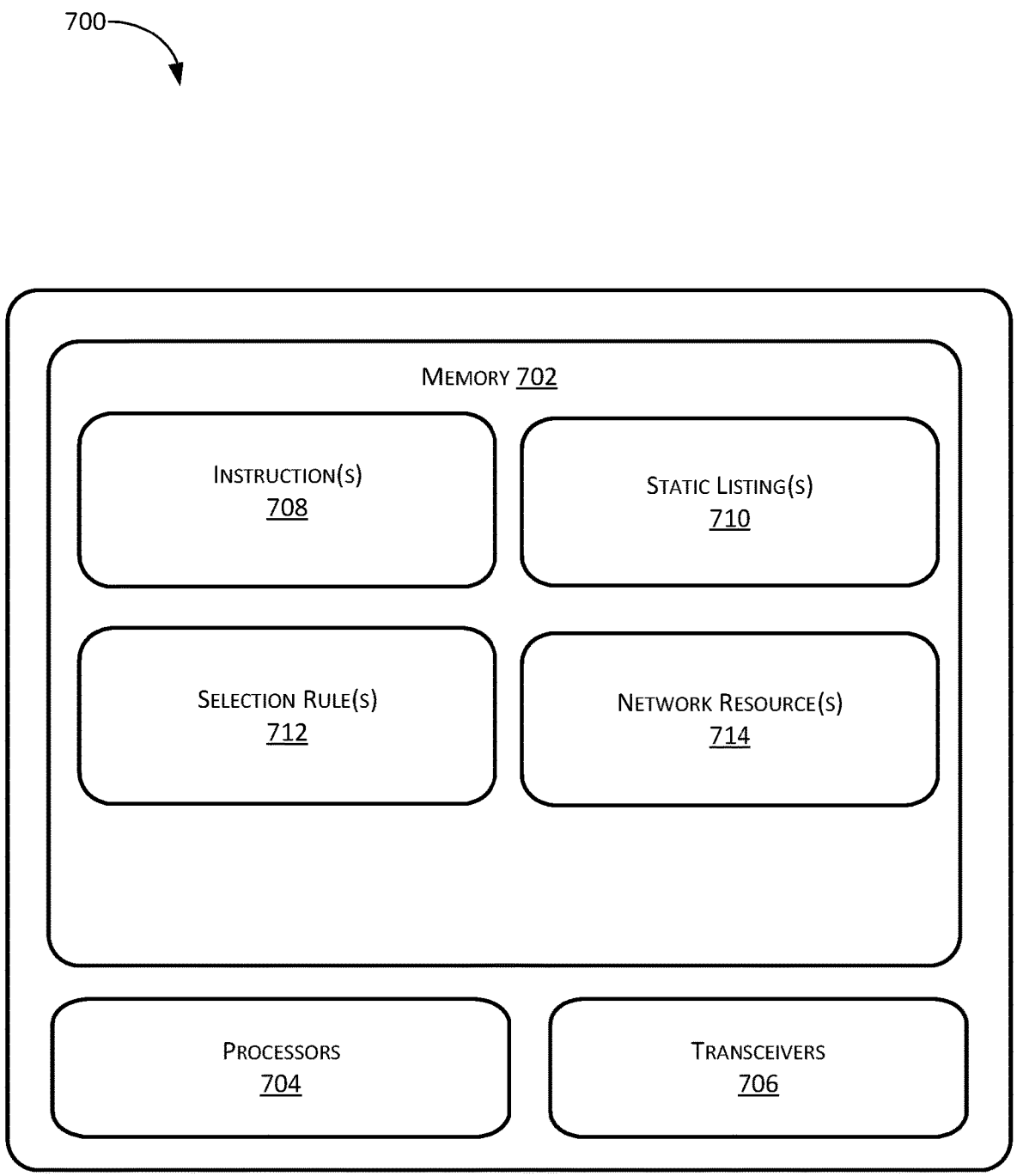
FIG. 7 is a block diagram of a control node capable of implementing the methods disclosed herein, in accordance with some examples of the present disclosure.

FIG. 7 illustrates a block diagram of a control node capable of implementing the methods disclosed herein, in accordance with some examples of the present disclosure. In some embodiments, control node 700 is can correspond to any of the control nodes discussed in FIGS. 1, 2, 3, 4, 5, and 6. As illustrated, control node 700 is generally comprised of memory 702, one or more processors 704, and one or more transceivers 706.

In some embodiments, memory 702 is volatile (such as RAM), non-volatile (such as ROM, flash memory, etc.) or some combination of the two. Memory 702 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that can be accessed by control node 700. Memory 702 can comprise one or more instructions 708 that are executed by processors 704 and cause processors 704 to perform operations of the methods discussed above. Further, memory 702 can comprise additional modules that can be executed by processors 704 and cause processors 704 to perform additional operations associated with control node 700. The additional modules can comprise network forwarding modules, network monitoring modules, and other network modules.

In some embodiments, processors 704 can include one or more central processing units (CPUs), one or more graphics processing units (GPUs), both CPUs and GPUs, or other processing units or components known in the art.

In some embodiments, transceivers 706 can include one or more wired or wireless transceivers. For example, transceivers 706 can include a network interface card, a network adapter, a LAN adapter, an address associated with a network connection, or another device permitting communications to be sent and received. Additionally, transceivers 706 can comprise any wireless transceiver capable of engaging in wireless, radio frequency (RF) communication. Further, transceivers 706 can also include other wireless modems, such as Wi-Fi, WiMax, Bluetooth, and/or infrared communication modems.

In some embodiments, instructions 708 can cause processors 704 and transceivers 706 to perform operations that comprise the methods discussed above. These operations include, but are not limited to, receiving a user device connection from a network node associated with the user-side packet core, selecting a group of control functions based at least on static listings 710, identifying a control function based at least on selection rules 712, communicating with other network nodes based at least on network resources 714, and establishing a session between the user device and the control function. Additionally, instructions 708 may further cause operations that include: determining a plurality of control functions associated with the network, receiving an identifier associated with the user device from a mobile session management node, sending a request that includes the identifier to another device associated with the network, receiving an indication associated with a control function and/or a group of control functions, and other operations described above.

In some embodiments, static listings 710 can comprise one or more identifier ranges and identifier values that are associated with one or more groups of control functions associated with the network.

In some embodiments, selection rules 712 can comprise rules that can determine a control function from a group of control functions to establish a session with. In at least one embodiment, selection rules 712 can cause the sequential selection and iteration between all control functions in a group of control functions regardless of other factors. In at least one additional embodiment, selection rules 712 can consider the load associated with each available control function of the group of control functions. Additionally, the load for an available control function can be acquired via a monitoring module. Accordingly, selection rules 712 can allocate user device connections according to each available control function load, capacity, or other indication of the current computation load experienced by a control function. Further, Selection Rules 712 can include any other means for identifying and selecting an individual control function. Subsequently, a session between a network node and the control function can be established and the user device can be connected with the control function. The network node can be control node 700 or a network node that establishes a session with a control function based on instructions from control node 700.

In some embodiments, network resources 714 can be a listing of other network nodes, servers associated with the network, or network resources that may be consulted during the operations caused by the instructions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    determining a plurality of Proxy Call Session Control Functions (P-CSCFs) associated with a network;
    identifying a plurality of P-CSCF groups, each including different multiple ones of the plurality of P-CSCFs, wherein each P-CSCF group is designated, via an associated designation, for serving user devices associated with different sets of one or more capabilities;
    receiving, at a control node and from a mobile session management node (MSMN), a request to connect to the network, the request including an identifier associated with a user device, the identifier being a device identifier or user identifier;
    determining, based at least in part on the identifier, that the user device is associated with one or more capabilities; and
    creating, based at least in part on the identifier and a designation associated with a first P-CSCF group of the plurality of P-CSCF groups that the first P-CSCF group is designated for serving user devices associated with the determined one or more capabilities, a session between the user device and the first P-CSCF group.

2. The method of claim 1, wherein the identifier associated with the user device comprises at least one of:
    an International Mobile Equipment Identifier (IMEI);
    an International Mobile Subscriber Identifier (IMSI);
    a Subscription Permanent Identifier (SUPI); or
    an IMS Private User Identity (IMPI).

3. The method of claim 1, wherein the control node is one of a Packet Gateway (PGW) or a Session Management Function (SMF).

4. The method of claim 1, wherein the one or more capabilities include at least one of:
    a subscription associated with a level of service;
    an alternative network compatibility associated with equipment functionality;
    a subscriber account associated with a second network; or
    a high security connection associated with increased network resource consumption.

5. The method of claim 1, wherein identifying the first P-CSCF group is based at least in part on a static listing associated with the control node; and
    wherein determining that the user device is associated with the one or more capabilities is based at least in part on the static listing including the identifier associated with the user device.

6. The method of claim 1, wherein determining the plurality of P-CSCFs further comprises registering the plurality of P-CSCFs with a Network Resource Function (NRF); and
    wherein determining that the user device includes the one or more capabilities further comprises:
        sending, from the control node, the identifier to the NRF; and
        receiving, at the control node, an indication that the user device is associated with the one or more capabilities and is to be connected with the first P-CSCF group.

7. The method of claim 1, wherein determining that the user device is associated with the one or more capabilities further comprises:
    sending, from the control node, the identifier to a domain name system (DNS); and
    receiving, at the control node, a Fully Qualified Domain Name (FQDN) associated with a P-CSCF of the first P-CSCF group.

8. The method of claim 1, wherein the designation is a first designation, the user device is a first user device, the identifier is a first identifier, and the session is a first session, the method further comprising:
    identifying a second P-CSCF group of the plurality of P-CSCFs that is designated, via a second designation, for serving additional user devices;
    receiving a second identifier associated with a second user device;
    determining, based on the second identifier, that the second user device is associated with one or more different capabilities; and
    creating a second session between the second user device and the second P-CSCF group.

9. A system comprising:
    one or more processors;
    a memory; and
    one or more instructions stored in the memory and executable by the one or more processors to perform operations comprising:
        determining a plurality of control functions associated with a network;
        identifying a plurality of control function groups, each including different multiple ones of the plurality of control functions, wherein each control function is designated, via an associated designation, for serving user devices associated with different sets of one or more capabilities;
        receiving, from a session management node, a request to connect with the network, the request including an identifier associated with a user device, the identifier being a device identifier or user identifier;
        determining, based on the identifier, that the user device is associated with one or more capabilities;
        creating, based at least in part on the identifier and a designation associated with a first of control function group of the plurality of control function groups that the first of control function group is designated for serving user devices associated with the determined one or more capabilities, a session between the user device and the first control function group.

10. The system of claim 9, further comprising:
    determining one or more functionalities associated with the plurality of control functions,
    wherein the one or more functionalities are associated with at least one or more of:
        real-time services;

high security applications;
encryption services;
one or more unique authentication;
local breakdown capabilities;
one or more service levels; and
rich communication services.

11. The system of claim 9, further comprising one or more transceivers, the one or more transceivers capable of communicating with at least one of:
the plurality of control functions;
a Domain Name System (DNS) associated with the network; or
a Network Resource Function (NRF) associated with the network.

12. The system of claim 9, the operations further comprising:
receiving, at the system, a second request to connect with the network and a second identifier associated with a second user device;
determining, based on the second identifier, that the second user device is a roaming user device associated with a second network;
identifying a second group of control functions that is designated, via a second designation, to serve the second user device; and
creating a second session between the second user device, the second group of control functions, and the second network.

13. The system of claim 9, further comprising determining one or more functionalities associated with the plurality of control functions, wherein the first group of control functions is associated with the designation based on information provided by the first group of control functions, the information comprising indications of the one or more functionalities and the one or more user device capabilities associated with the one or more functionalities.

14. The system of claim 9, further comprising:
determining one or more functionalities associated with the plurality of control functions;
wherein the designation indicates that the first group of control functions includes one or more first functionalities associated with the one or more user device capabilities; and
wherein, the one or more first functionalities are associated with the one or more user device capabilities based on at least one of:
the one or more user device capabilities require the one or more first functionalities;
the one or more user device capabilities utilize the one or more first functionalities; or
the user device lacks one or more second capabilities associated with one or more second functionalities.

15. A method comprising:
determining a plurality of control functions associated with a network;
identifying a plurality of control function groups, each including different multiple ones of the plurality of control functions, wherein each control function is designated, via an associated designation, for serving user devices associated with different sets of one or more capabilities;
receiving, from a session management node, a request to connect with the network, the request including an identifier associated with a user device, the identifier being a device identifier or user identifier;
determining, based on the identifier, that the user device is associated with one or more capabilities; and
creating, based at least in part on the identifier and a designation associated with a first of control function group of the plurality of control function groups that the first of control function group is designated for serving user devices associated with the determined one or more capabilities, a session between the user device and the first control function group.

16. The method of claim 15, wherein creating the session between the user device and the group of control functions further comprises:
identifying a first control function of the group of control functions to connect with the user device.

17. The method of claim 16, wherein identifying the first control function further comprises:
determining a first capacity associated with the first control function of the group of control functions;
determining a second capacity associated with a second control function of the group of control functions;
determining, based on the first capacity and the second capacity, that the first capacity is less than the second capacity; and
creating the session between the user device and the first control function associated with the first capacity.

18. The method of claim 15, further comprising:
determining one or more functionalities associated with the plurality of control functions,
wherein determining that the one or more user device capabilities utilize the one or more functionalities further comprises:
determining that the group of control functions is associated with one or more identifier values that include the identifier associated with the user device.

19. The method of claim 15, further comprising:
determining one or more functionalities associated with the plurality of control functions;
identifying one or more additional groups of control functions associated with the network, the one or more additional groups of control functions including one or more control function capabilities associated with the group of control functions;
assigning the group of control functions the one or more functionalities; and
determining one or more identifier values associated one or more user devices capable of at least utilizing the one or more functionalities.

20. The method of claim 15, further comprising:
determining one or more functionalities associated with the plurality of control functions;
identifying an additional group of control functions comprising one or more second control functions associated with a network;
determining one or more additional functionalities associated with the additional group of control functions;
determining that the one or more user device capabilities utilize the one or more additional functionalities; and
determining that the one or more user device capabilities utilize the one or more functionalities more than the one or more additional functionalities.

* * * * *